(12) United States Patent
Terasaki

(10) Patent No.: US 6,947,572 B2
(45) Date of Patent: Sep. 20, 2005

(54) IMAGE TRANSMISSION SYSTEM, METHOD OF THE SAME, AND RECORDING MEDIUM

(75) Inventor: Hiroshi Terasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 738 days.

(21) Appl. No.: 09/955,146

(22) Filed: Sep. 19, 2001

(65) Prior Publication Data

US 2002/0037091 A1 Mar. 28, 2002

(30) Foreign Application Priority Data

Sep. 25, 2000 (JP) ........................................ 2000-289765

(51) Int. Cl.$^7$ ................................................ G06K 9/00
(52) U.S. Cl. ...................................... 382/100; 709/203
(58) Field of Search ................................ 382/100, 298, 382/299, 240, 302, 305, 232; 709/203; 705/57; 713/176

(56) References Cited

U.S. PATENT DOCUMENTS

| | | | | | |
|---|---|---|---|---|---|
| 6,385,596 | B1 | * | 5/2002 | Wiser et al. | 705/51 |
| 6,675,210 | B1 | * | 1/2004 | Takeo et al. | 709/224 |
| 6,785,815 | B1 | * | 8/2004 | Serret-Avila et al. | 713/176 |

FOREIGN PATENT DOCUMENTS

EP 0705025 A2 * 9/1995 ............ H04N/1/40

* cited by examiner

Primary Examiner—Jon Chang
Assistant Examiner—A. Upreti
(74) Attorney, Agent, or Firm—McGinn & Gibb, PLLC

(57) ABSTRACT

An image transmission system includes: a client; a server; and a network connecting the client and the server. The client includes: an image request section that requests transmission of image data; an output instruction section that issues an output instruction for an image data file of a general purpose format; and an output section that outputs the image data file of the general purpose format specified as an output file. The server includes: a watermark insertion section that forms high-resolution data as an image data file to be transmitted and low-resolution data as a general purpose format file of image data to which an electronic watermark is given to specify the high-resolution data as watermark information whose resolution is reduced relative to the high-resolution data; and a distribution section that transmits the high-resolution data, the low-resolution data and a data selection program. The data selection program allows the client to detect existence of the low-resolution data to which the output instruction is made, and it specifies the high-resolution data from watermark information to designate the high-resolution data as the output file when the electronic watermark is detected and designates the low-resolution data as the output file when the electronic watermark is not detected.

6 Claims, 15 Drawing Sheets

Image TRANSMISSION SYSTEM, METHOD
OF THE SAME, AND RECORDING MEDIUM

BACKGROUND OF THE INVENTION (1) Field of the Invention

The present invention relates to an image transmission system, a method thereof, and a recording medium. The present invention particularly relates to an image transmission system and a method thereof that transmit an image from a server providing the image to a client who displays and prints the image via a network, and to a recording medium.

(2) Description of the Related Art

In recent years, contents distribution of a static image, music, a moving image and the like has been popular with spreading of the Internet. In the current distribution system, data flowing on the Internet are encoded to prevent illegal copying, which makes tapping difficult at a relay server. In addition, to prevent illegal copying and a secondary effusion by a user who bought the contents, a method of protecting copyright by encoding the data itself and a method of using an image format that can only be used by an exclusive application have been taken when recording the contents in a recording unit such as a hard disk.

However, the user suffered disadvantage because he/she was not able to display and manage the image by using an accustomed general purpose image display application for displaying an image data file of a general purpose format and a general purpose image management application.

Moreover, a method of deterring the illegal copying by using an electronic watermark in image data is used. But, there has been a problem that the illegal copying cannot be prevented although assertion of the right by a copyright holder can be made when using the electronic watermark and it functions as deterrence of the illegal copying.

SUMMARY OF THE INVENTION

The object of the present invention to provide an image data transmission system and a method thereof in which display and management of an image can be performed by using a general purpose image display application and a general purpose image management application.

In an exemplary embodiment, the image transmission system of the present invention includes a client having an image request section that requests transmission of the image data, an output instruction section that instructs output of the image data file of the general purpose format, and an output section that outputs the image data file of the general purpose format designated as an output file. Additionally, the invention includes a server having a watermark insertion section that forms low-resolution data as the general purpose format file of an image data, to which the electronic watermark is provided to specify high-resolution data as watermark information whose resolution is reduced relative to the high-resolution data as the image data file to be transmitted. When the client requests transmission of the image data file, a distribution section that transmits the high-resolution data, the low-resolution data, and a data selection program that detects existence of the electronic watermark of the low-resolution data whose output is instructed by the client, and allows the client to execute a watermark detection processing in which the high-resolution data is specified from the watermark information to designate the high-resolution data as the output file when the watermark information is detected, and to designate the low-resolution data as the output data when the watermark information is not detected. A network connects the client and the server.

In the present invention, display and management of the image can be performed by using the general purpose image display application and the general purpose image management application and the illegal copying by the user who bought the contents can be prevented by transmitting the high-resolution data as the image data file to be transmitted, the low-resolution data as the general purpose format file of the image data, to which an electronic watermark is given to specify the high-resolution data as watermark information whose resolution is reduced, and program that detects existence of the electronic watermark of the low-resolution data whose output is instructed by the client, and allows the client to execute a watermark detection processing in which the high-resolution data is specified from the watermark information to designate the high-resolution data as the output file when the watermark information is detected and the low-resolution data is designated as the output data when the watermark information is not detected.

BRIEF DESCRIPTION OF THE DRAWINGS

FIG. 7 is a view showing an example of embedding method of information into a replaced bitplane of the low-resolution data 23a.

DETAILED DESCRIPTION OF THE PREFERRED EMBODIMENTS

Description will be made for the embodiments of the present invention with reference to the drawings.

Figure 1:
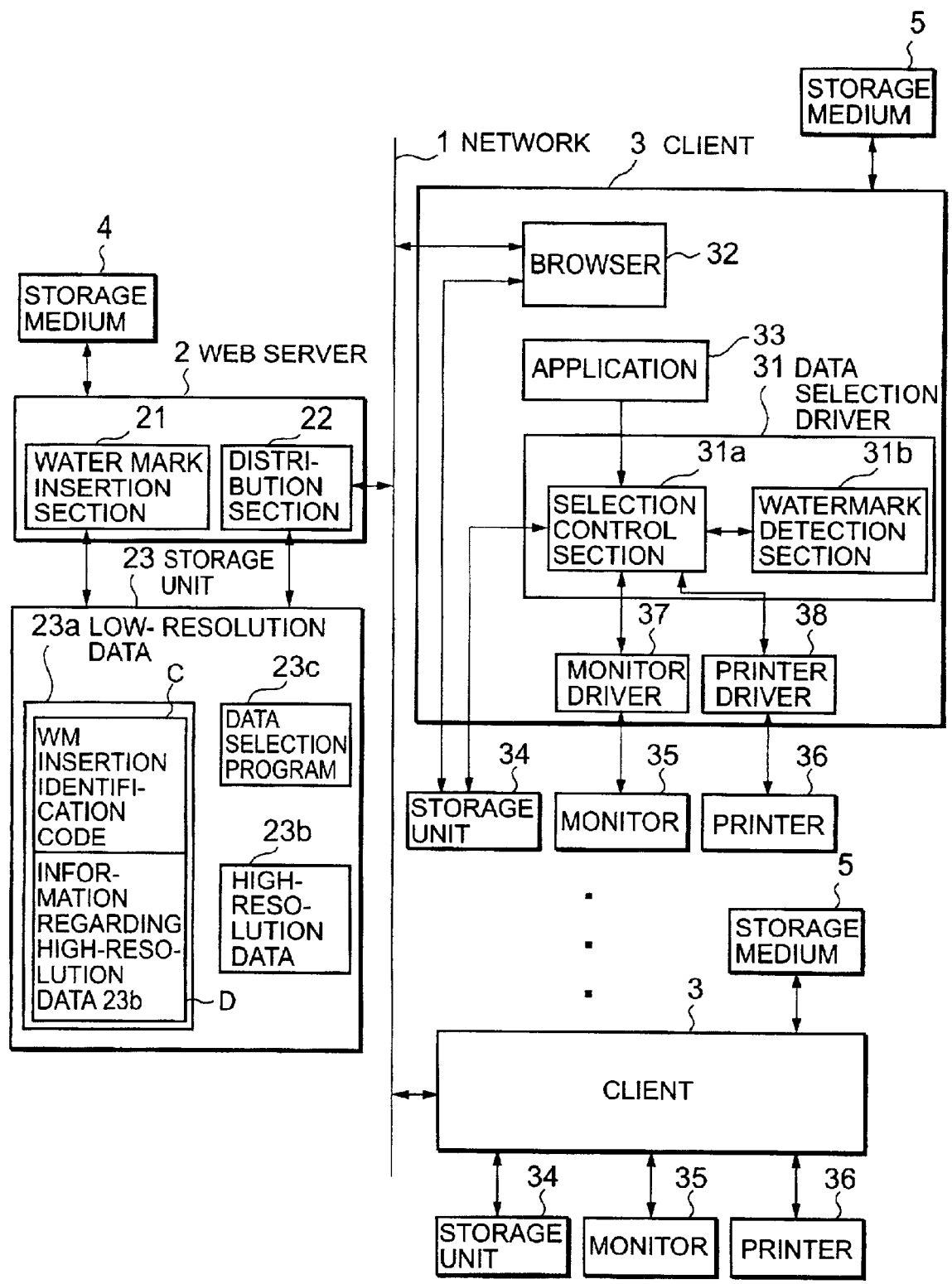
FIG. 1 is a view showing the constitution of a first embodiment of the image data transmission system according to the present invention.

FIG. 1 is a view showing the first embodiment of the image data transmission system of the present invention.

The image data transmission system of the present invention is a system in which a web server 2 and a plurality of clients 3 are connected to a network 1, and that transmits image data from the web server 2 to the client 3 who requests image data transmission.

The web server 2 comprises a watermark insertion section 21 and a distribution section 22, and is connected with a storage unit 23 such as a hard disk. In the storage unit 23, low-resolution data 23a as image data whose resolution is low enough such that transmission outline can be grasped for browsing, high-resolution data 23b as high-resolution image data to be distributed only to a buyer of the image data, and a data selection program 23c that makes the client 3 execute processing to select display and printing when these data are displayed and printed.

Image formats of the low-resolution data 23a and the high-resolution image data 23b are in a general purpose format of an image file, for example, a JPEG format (Joint Photographic Experts Group). The JPEG format is the one in which static image data is transformed from a spacial expression, that is, a pixel domain expression, to a frequency domain expression by using a discrete cosine transformation (DCT), where the static image data can be efficiently encoded, and is a compression method most widely used in the market.

The watermark insertion section 21 inserts an electronic watermark including, for example, an electronic watermark identification code (hereinafter, referred to as a WM (watermark) insertion identification code) C, a storage position of the high-resolution data 23b and information D such as a file name, into the low-resolution data. In addition, the electronic watermark of information showing the holder of a copyright may be inserted into the high-resolution data 23b.

The distribution section 22 distributes only the low-resolution data 23a when a browse request is made by the client 3, and distributes the low-resolution data 23a, the high-resolution data 23b and the data selection program 23c to the client 3 via the network. These may be distributed by being compressed in one file.

The data selection program 23c, by being setup by the client 3, is the program to realize a function of a data selection driver 31 that makes the client 3 to select display and printing of the low-resolution data 23a and the high-resolution data 23b.

The client 3 comprises the data selection driver 31, a browser 32 and an application 33, and is connected to a storage unit 34 such as the hard disk storing the low-resolution data 23a, the high-resolution data 23b and the data selection program 23c that have been distributed. Moreover, the client 3 is connected to a monitor 35 that displays the low-resolution data 23a and the high-resolution data 23b and to a printer 36 that prints the data, and the client 3 is provided with a monitor driver 37 and a printer driver 38.

The browser 32 requests browse and purchase of the low-resolution data 23a and the high-resolution data 23b to the web server 2.

The application 33 specifies the low-resolution data 23a to instruct display and printing.

The data selection driver 31 comprises an electronic watermark detection section 31b and a selection control section 31a. The electronic watermark detection section 31b reads the low-resolution data 23a specified by a display instruction and a printing instruction from the application 33 from the storage unit 34 to detect whether or not the electronic watermark is inserted. The selection control section 31a directly passes the specified low-resolution data 23a to the monitor driver 37 or the printer driver 38 if the electronic watermark is not inserted, and obtains the storage location, the file name and the like of the high-resolution data 23b, which corresponds to the specified low-resolution data 23a, from the inserted watermark information if the electronic watermark is inserted.

Herein, an example of inserting the electronic watermark into the low-resolution data 23a of the watermark insertion section 21 will be described with reference to FIG. 2 and FIG. 3.

An original image of the low-resolution data 23a shall be monochromatic gradation image data constituted of data having, for example, eight bits per one pixel. The watermark insertion section 21, as shown in FIG. 2, decomposes the bitplane constituted of one bit information of the same level of each pixel into eight pieces. Herein, the least significant plane P0 shows an aggregate of LSBs (least significant bits) of each pixel, and the most significant plane P7 shows an aggregate of MSBs (most significant bits). The watermark insertion section 21 exchanges a predetermined relatively least significant bitplane, the fourth bitplane P3 from the least significant bit for example, of the original image of the low-resolution data 23a with a plane including the watermark information, and thus the electronic watermark is inserted.

Figure 2:
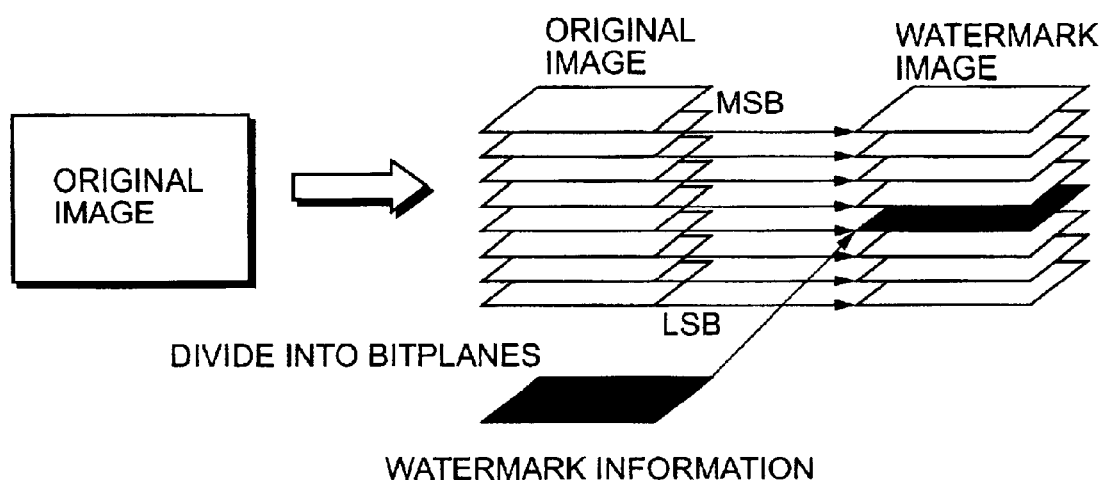
FIG. 2 is a view showing an example of an insertion method of the electronic watermark into low-resolution data 23a of an insertion section 21 of FIG. 1.
Figure 3:
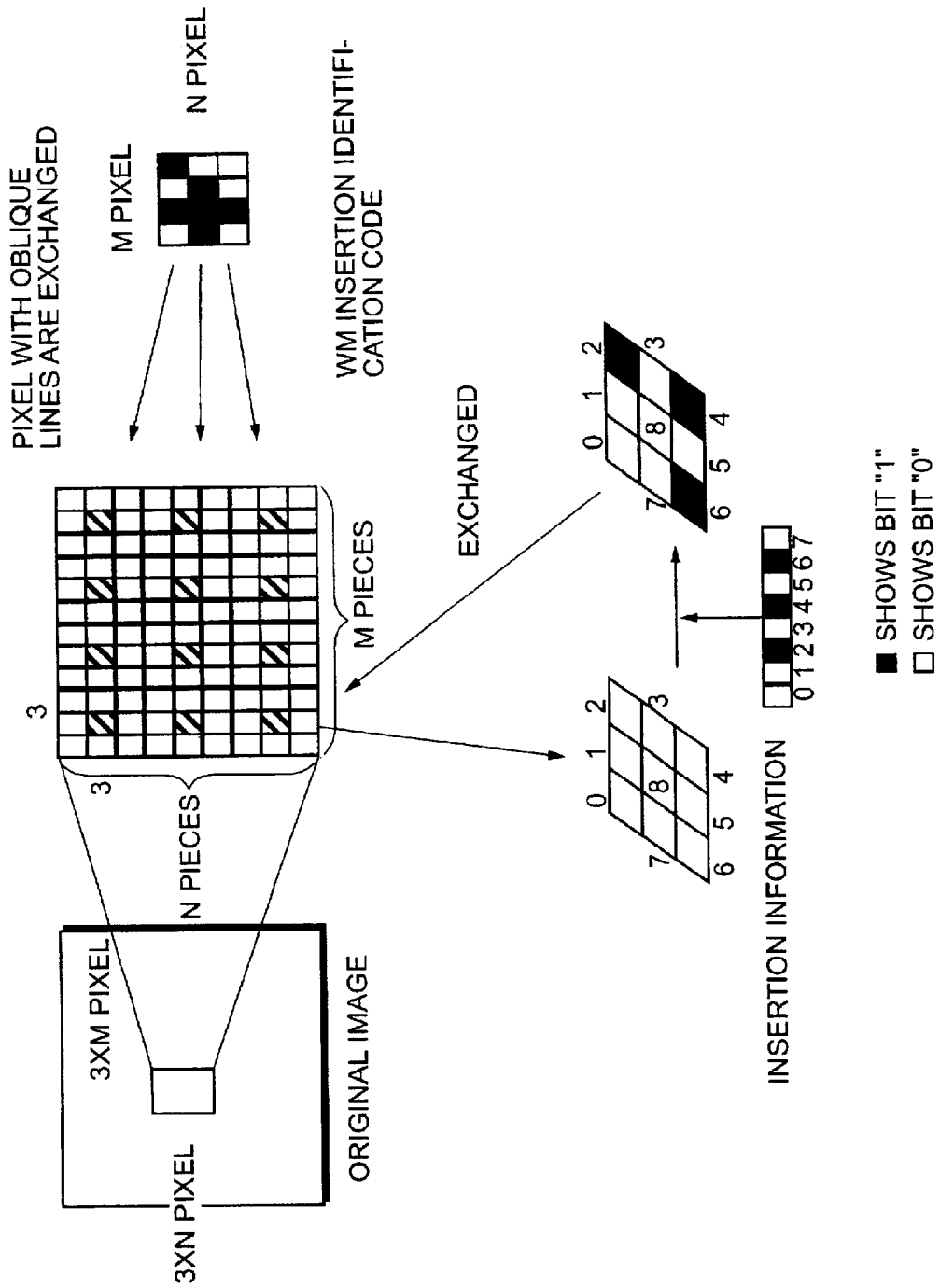
FIG. 3 is a view showing an example of embedding information to a bitplane P3 of FIG. 2.

FIG. 3 is a view showing an example of embedding information to the bitplane P3 of FIG. 2. In the exchanged bitplane P3 including the watermark information, as shown in FIG. 3 for example, particular region of 3×M pixels (vertical) and 3×N pixels (horizontal) (M and N are integers of 1 or more) is divided into blocks having 3×3 pixels and information is embedded into each block of M×N pieces by one byte (eight bits) by embedding one bit information in eight peripheral pixels of each block, and thus the storage position of the high-resolution data 23b and the information D such as the file name are embedded. Moreover, the WM insertion identification code C is made to be pattern information of the M×N pixels for example, and the information of each bit of the WM insertion identification code C is severally embedded into a central pixel of each block by one bit.

Returning to FIG. 1, the monitor driver 37, when the display instruction is issued, displays the low-resolution data 23a selected by the data selection driver 31 or the high-resolution data 23b corresponding to the selected low-resolution data 23a on the monitor 35. The printer driver 38, when the printing instruction is issued from the application 33, outputs the low-resolution data 23a selected by the data selection driver 31 or the high-resolution data 23b corresponding to the selected low-resolution data 23a to the printer 36. The monitor driver 37 and the print driver 38 reproduces the low-resolution data 23a and the high-resolution data 23b, which are stored in the storage unit 34 of the client 3 in the image format of the JPEG standard, by using an inverse discrete cosine transformation (IDCT), and outputs the data to the printer 36.

Note that the web server 2 and the client 3 are constituted of an information processing unit such as a workstation server and a personal computer, mechanically read programs recorded in storage media 4 and 5 as a floppy disk, a hard disk and a magneto-optic disk, and may perform processing described as the processing of each component based on the program severally recorded in the storage media 4 and 5.

Figure 4:
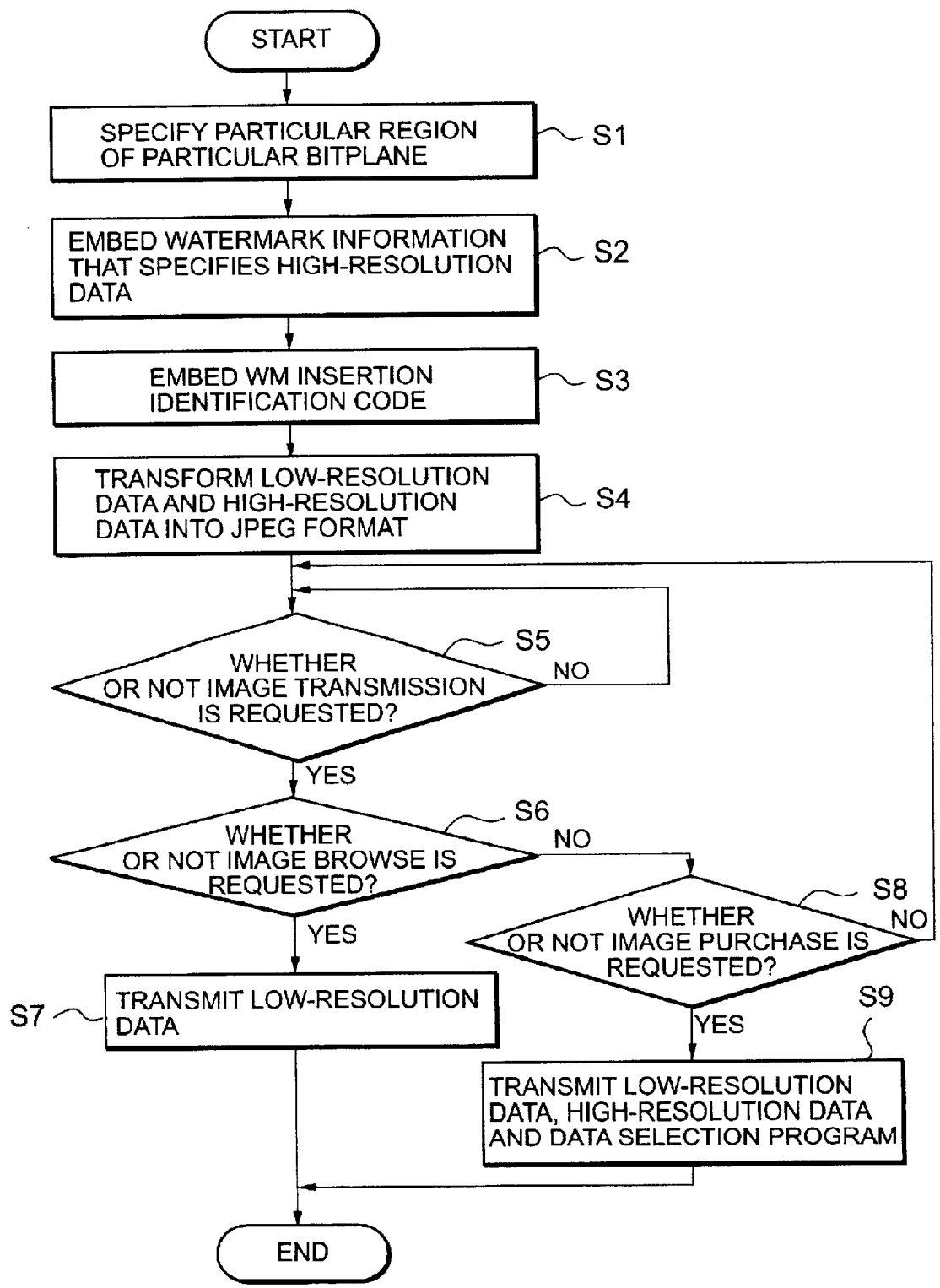
FIG. 4 is a flowchart showing an operation in which the image transmission of FIG. 1 is performed.

Next, description will be made for operation of the image transmission of FIG. 1. FIG. 4 is a flowchart showing the operation performing the image transmission of FIG. 1. Firstly, the watermark insertion section 21 specifies a predetermined particular region of a particular bitplane of the low-resolution data 23a as an area where the watermark information is inserted (step S1). Herein, for example, the fourth bitplane P3 from the least significant bitplane is specified as shown in FIG. 2, and the particular region of 3×M pixels (vertical) and 3×N pixels (horizontal) (M and N are integers of 1 or more) is specified as shown in FIG. 3. Then, the watermark information for specifying the high-resolution data 23b is embedded therein (step S2). For example, as shown in FIG. 3, the particular region is divided into blocks having 3×3 pixels and information is embedded into the 3×3 pixel block of M×N pieces by one byte (eight bits) by embedding one bit information in eight peripheral pixels of each block, and the information D regarding the high-resolution data 23b corresponding to the low-resolution data 23a is embedded as the watermark information. Moreover, as shown in FIG. 3, the information is embedded into the central pixel of the 3×3 pixel block of M×N pieces by one bit, and the WM insertion identification code C that consists of the pattern of M×N pixels, that is, the information having the meaning that the watermark information has been inserted is embedded (step S3). In addition, the low-resolution data 23a and the high-resolution data 23b are transformed into the JPEG format (step S4).

When access of image browse is made by the browser 32 of the client 3, the distribution section 22 of the web server 2 transmits the low-resolution data 23a (steps S5, S6 and S7). The browser 32 of the client 3 receives the low-resolution data 23a to reproduce the transmitted low-resolution data 23a of the JPEG, and the monitor 35 displays the image that has been reproduced.

When access of image purchase is made by the browser 32 of the client, the distribution section 22 of the web server 2 transmits the low-resolution data 23a, the high-resolution data 23b and the data selection program 23c simultaneously to the client 3 (steps S5, S6, S8 and S9). Herein, the distribution section 22 of the web server 2 prepares and distributes data in which the low-resolution data 23a, the high-resolution data 23b and the data selection program 23c are compressed, and the browser 32 of the client 3 receives the data to store in the storage unit 34. The compressed data is compressed in a LZH format, a ZIP format or the like.

Based on the user's operation, an exclusive application (not shown) provided in the client 3 extracts the transmitted data in which the low-resolution data 23a, the high-resolution data 23b and the data selection program 23c are compressed. This data extraction divides the data into the low-resolution data 23a of the JPEG format, the high-resolution data 23b of the JPEG format and the data selection program 23c without letting the user notice it, and stores the divided data into the storage unit 34.

Note that the data selection program 23c, based on the operation of the user, is setup so as to select a file to be displayed and printed when the display instruction and the printing instruction are made from the application 33.

Next, description will be made for operation of display or printing of the low-resolution data 23a and the high-resolution data 23b referring to FIG. 5.

Figure 5:
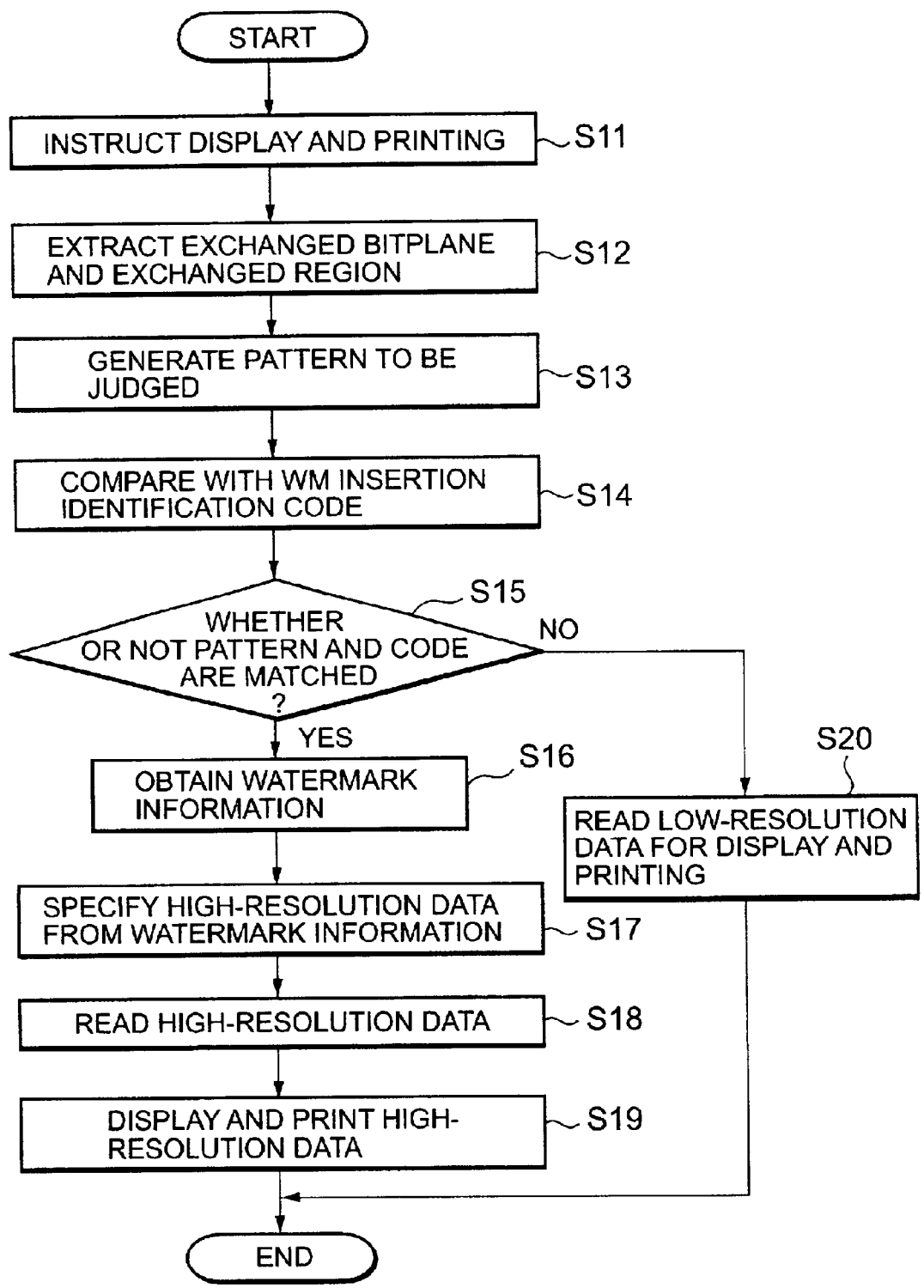
FIG. 5 is a flowchart showing an operation of display or printing of the low-resolution data 23a and high-resolution data 23b of FIG. 1.

In FIG. 5, the application 33, based on the user's operation, specifies the low-resolution data 23a to be displayed or printed, and issues the display instruction or the printing instruction to the selection driver 31 (step S11).

The selection control section 31a of the selection driver 31 reads out the selected low-resolution data 23a from the storage unit 34, and sends the data to the electronic watermark detection section 31b. The electronic watermark detection section 31b reproduces the low-resolution data 23a of the JPEG format, divides the reproduced image into the bitplanes, and extracts the particular region of 3×M pixels (vertical) and 3×N pixels (horizontal) (M and N are integers of 1 or more) of, for example, the bitplane P3, based on the information of the predetermined bitplane for exchange and the region for exchange (step S12). Then, the region is divided into the blocks having 3×3 pixels, and the pattern to be judged is formed from the central pixel of each block for detecting the existence of the electronic watermark having M×N pixels (step S13). And then, the pattern to be judged that has been formed and the WM insertion identification code C as the M×N pixel pattern same as the one in which the watermark information is inserted are compared (step S14). If the pattern and the code C match, the selection control section 31b is notified of detecting the electronic watermark, and thus the selection control section 31a obtains the watermark information. For example, the selection control section 31a extracts the one bit information from the peripheral eight pixels of each block, and obtains M×N bytes in total, that is, 1 byte (eight bits) from each block, of the watermark information. Then, the selection control section 31a obtains the information (the storage position, the file name, date, a file size and the like) from the watermark information to specify the high-resolution data 23b (step S17). The high-resolution data 23b is read out from the storage unit 34 based on the obtained information (step S18), and is passed to the monitor driver 37 and the data is displayed on a monitor 35 if it is the display instruction. If the data is the printing instruction, it is passed to the printer driver 38 to be printed in the printer 36 (step S19).

If the pattern to be judged and the WM insertion identification code C do not match, and the electronic watermark detection unit 31b does not match the electronic watermark, the selection control section 31a reads out the low-resolution data 23a. The selection control section 31a passes the data to the monitor driver 37 to be displayed on the monitor 35 if the data is the display instruction. If the data is the printing instruction, it is passed to the printer driver 38 to be printed in the printer 36 (step S20).

Next, the second embodiment of the present invention will be described.

Figure 6:
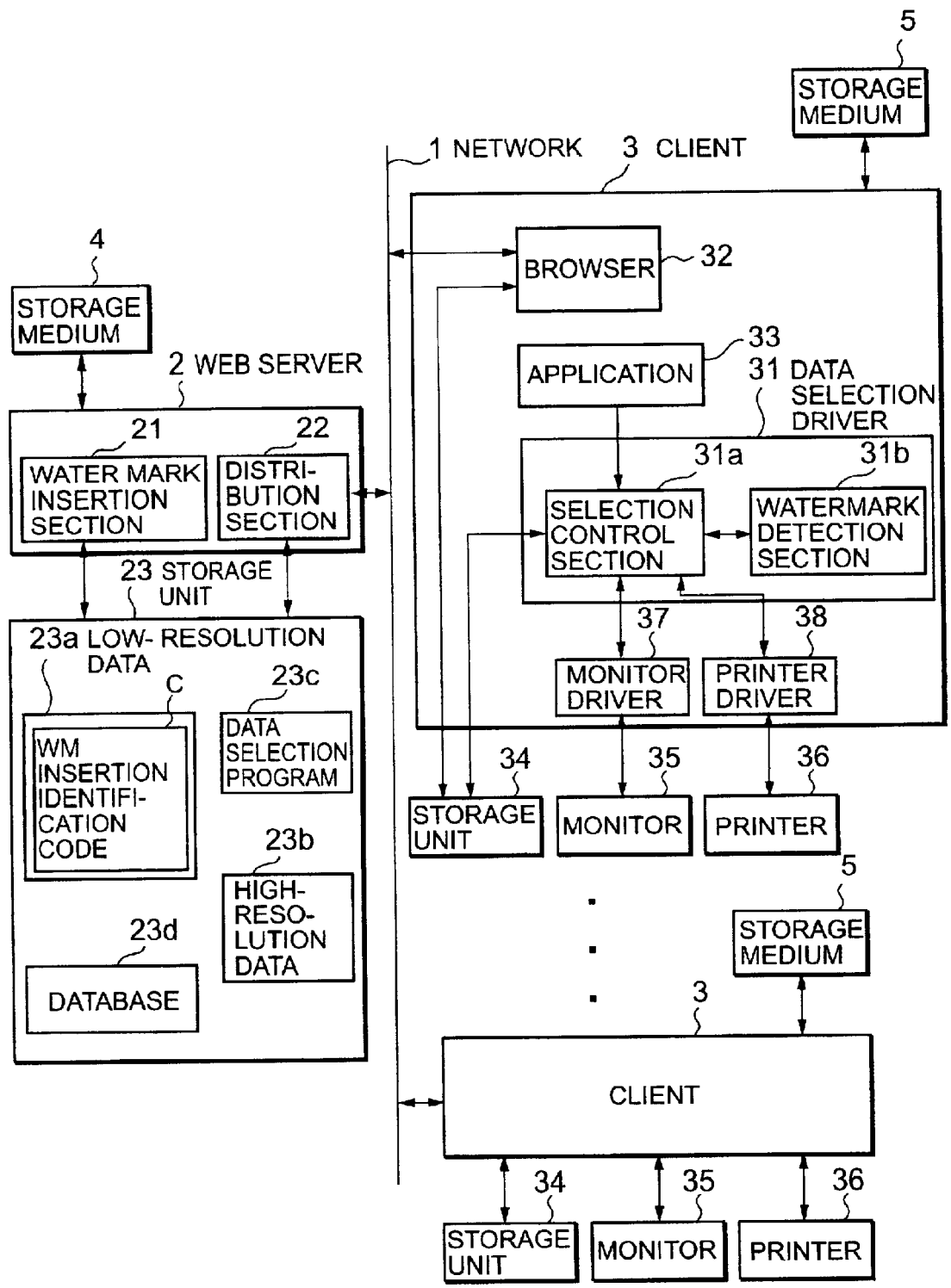
FIG. 6 is a block diagram showing the constitution of a second embodiment of the present invention.

FIG. 6 is a block diagram showing the constitution of this embodiment.

This embodiment, as shown in FIG. 6, is different from the first embodiment in that the storage unit 23 comprises a database 23d that stores a relation between the low-resolution data 23a and the high-resolution data 23b, and that the distribution section 22 distributes a purchased image database (not shown) that stores the relation of the low-resolution data 23a, to which a purchase request has been made, between the high-resolution data 23b along with the low-resolution data 23a, the high-resolution data 23b and the data selection program 23c to the client 3 via the network when the purchase request is made by the client 3. In addition, as shown in FIG. 7, this embodiment is also different from the first embodiment in that only the WM insertion identification C which consists of the pattern having M×N pixels is embedded in each pixel of the region of M×N pixels, in the exchanged bitplane of the low-resolution data 23a.

Figure 8:
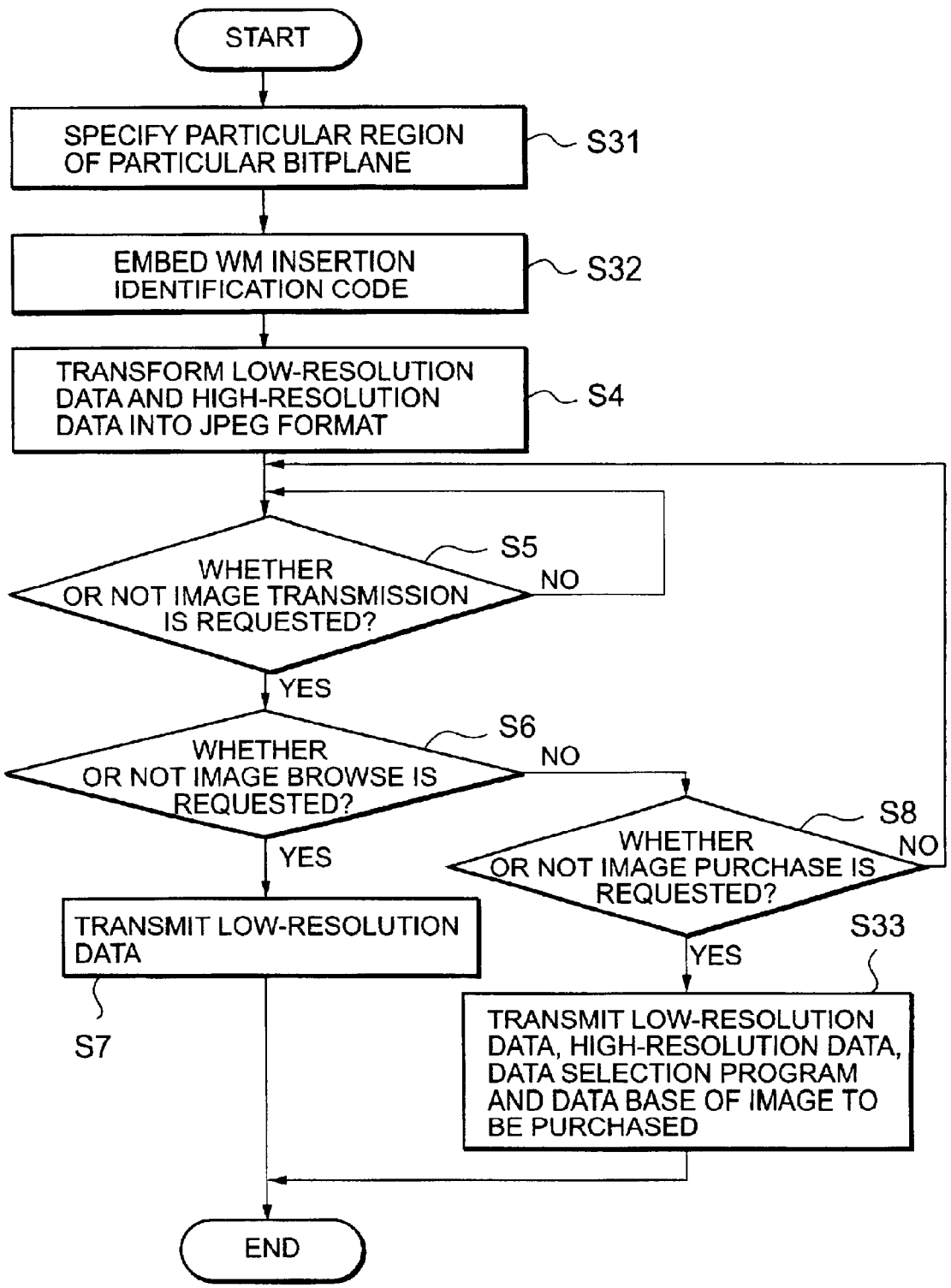
FIG. 8 is a flowchart showing an operation in which the image transmission of FIG. 6 is performed.

Next, description will be made for the operation in which the image transmission of FIG. 6 is performed with reference to FIG. 8. FIG. 8 is a flowchart showing the operation in which the image transmission of FIG. 6 is performed.

Figure 7:
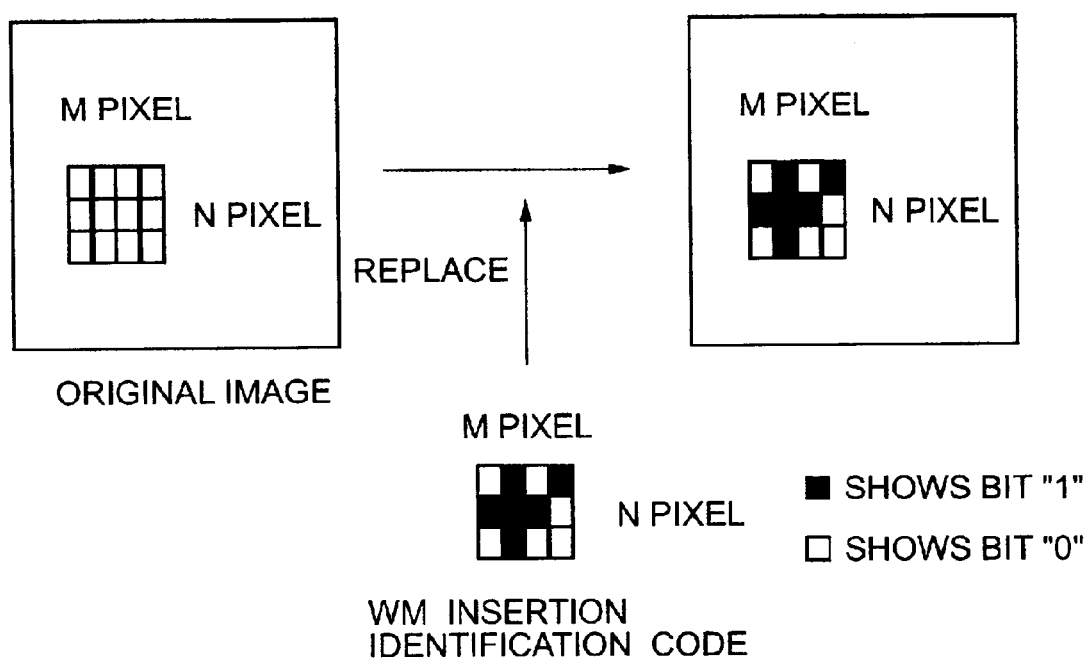

Firstly, the watermark insertion section 21 specifies the particular region of M×N pixels (M and N are integers of 1 or more) as shown in FIG. 7 (step S31), the WM insertion identification code C as the pattern of M×N pixels, which shows that the watermark has been inserted, is embedded in the area (step S32). Moreover, the low-resolution data 23a and the high-resolution data 23b are transformed into the JPEG format (step S4).

In response to the access for image browse from the browser 32 of the client 3, the distribution section 22 of the web server 2 transmits the low-resolution data 23a (steps S5, S6 and S7). The browser 32 of the client 3 receives the data to reproduce the transmitted low-resolution data 23a of the JPEG format, and the monitor 35 displays the reproduced image.

Next, in response to the access for image purchase from the browser 32 of the client 3, the distribution section 22 of the web server 2 refers to the database and generates the purchased image database (not shown) that stores the relation of the low-resolution data 23a, to which the purchase request has been made, between the high-resolution data 23b, and simultaneously transmits the low-resolution data 23a, the high-resolution data 23b, the data selection program 23c and the purchased image database to the client 3 (steps S5, S6, S8 and S33). At this point, the distribution section 22 of the web server 2 prepares and distributes data in which the low-resolution data 23a, the high-resolution data 23b, the data selection program and the purchased image database are compressed, and the browser 32 of the client 3 receives the data to store in the storage unit 34. The compressed data is compressed in the LZH format, the ZIP format or the like.

Based on the user's operation, the exclusive application (not shown) provided in the client 3 extracts the transmitted data in which the low-resolution data 23a, the high-resolution data 23b and the data selection program 23c are compressed. This data extraction divides the data into the low-resolution data 23a of the JPEG format, the high-resolution data 23b of the JPEG format, the data selection program 23c and the purchased image database without letting the user notice it, and stores the divided data into the storage unit 34.

Similarly to the first embodiment, the data selection program 23c, based on the operation of the user, is setup so as to select a file to be displayed and printed when the display instruction and the printing instruction are made from the application 33.

Figure 9:
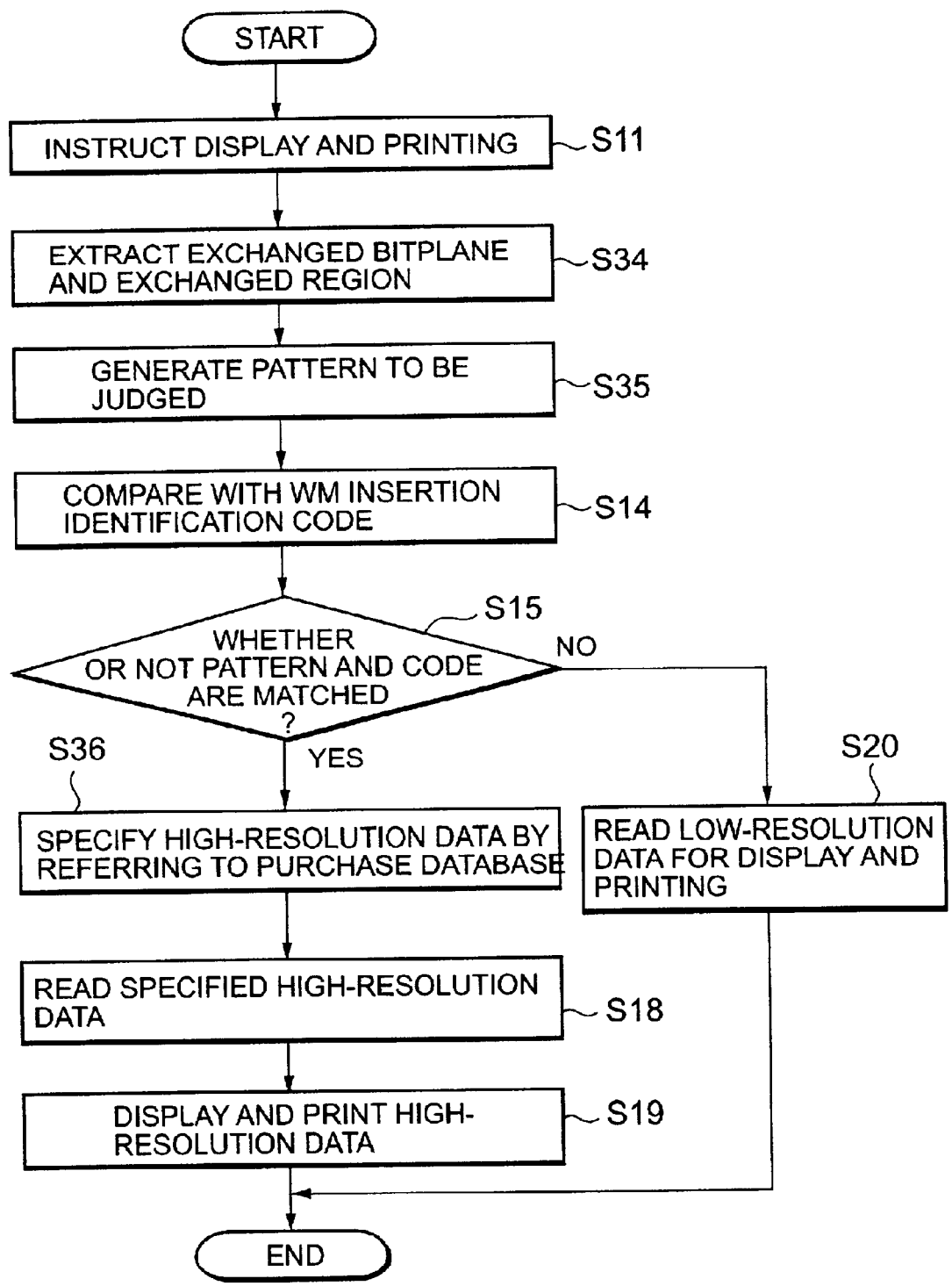
FIG. 9 is a flowchart showing an operation of display or printing of FIG. 6.

FIG. 9 is a flowchart showing the operation in which the display and the printing of FIG. 6 are performed.

Firstly, similarly to the first embodiment, the application 33, based on the user's operation, specifies the low-resolution data 23a to be displayed or printed, and issues the display instruction or the printing instruction to the selection driver 31 (step S11). Next, the selection control section 31a of the selection driver 31 reads out the selected low-resolution data 23a from the storage unit 34, and sends the data to the electronic watermark detection section 31b. The electronic watermark detection section 31b divides the low-resolution data 23a into the bitplanes, and extracts the particular region of M×N pixels (M and N are integers of 1 or more) of, for example, the bitplane P3 which is the fourth bitplane from the least significant one, based on the information of the predetermined bitplane for exchange and the region for exchange.

Next, in this embodiment, the pattern to be judged is generated from the region of the particular M×N pixels (M and N are integers of 1 or more) of the bitplane P3 (step S35). Next, the pattern to be judged and the WM insertion identification code C same as the one in which the watermark information is inserted are compared (step S14). If the pattern and the code match, it is judged that the electronic watermark has been detected, the purchased image database stored in the storage unit 34 is referred, the information D (the file name, the date, the file size and the like) regarding the high-resolution data 23b corresponding to the low-resolution data 23a is recognized, and then the high-resolution data 23b is specified (step S36). Then, the high-resolution data 23b specified by the storage unit 34 is read out (step S18). The data is passed to the monitor driver 37 and the data is displayed on the monitor 35 if it is the display instruction. If the data is the printing instruction, it is passed to the printer driver 38 to be printed in the printer 36 (step S19).

If the pattern to be judged and the WM insertion identification code C do not match, and the electronic watermark detection section 31b does not the electronic watermark, the selection control section 31a reads out the low-resolution data 23a. The selection control section 31a passes the data to the monitor driver 37 to be displayed on the monitor 35 if the data is the display instruction, similarly to the first embodiment. If the data is the printing instruction, it is passed to the printer driver 38 to be printed in the printer 36 (step S20).

Next, the third embodiment of the present invention will be described.

Figure 10:
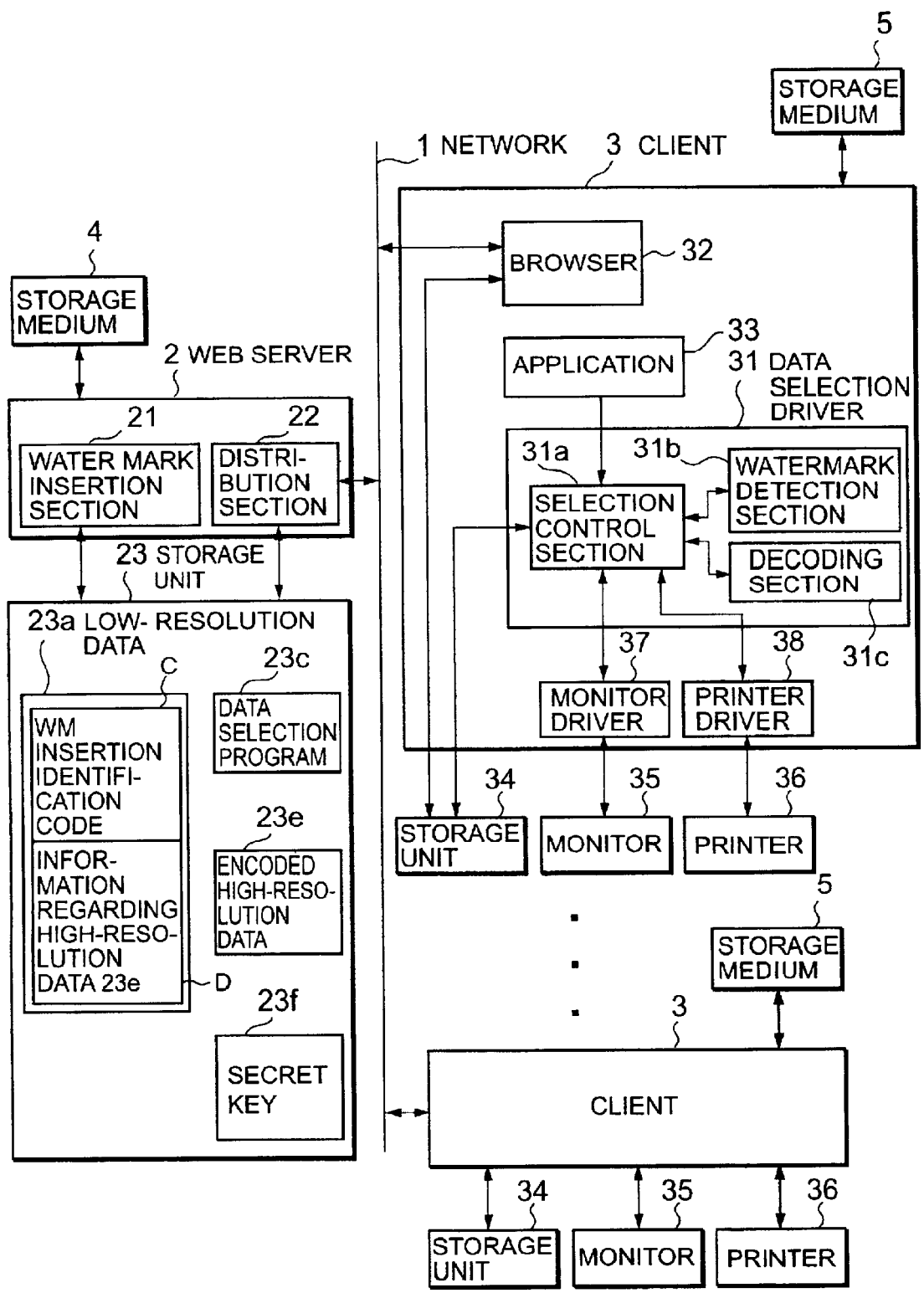
FIG. 10 is a block diagram sowing the constitution of a third embodiment of the present invention.

The third embodiment, as shown in FIG. 10, is different from the first embodiment in that the high-resolution data 23e is encoded by a secret key 23f held secretly in the storage unit 34, and that the data selection driver 31 of the client 3 is provided with a decoding section 31c that decodes the code of the encoded high-resolution data 23e. In this embodiment, the distribution section 22 distributes the low-resolution data 23a, the high-resolution data 23e, data selection program 23c and the secret key 23f to the client 3 via the network, when purchase request is made by the client 3. The decoding section 31c decodes the high-resolution data 23e by using the secret key 23f when the electronic watermark detection section 31b detects the electronic watermark.

Figure 11:
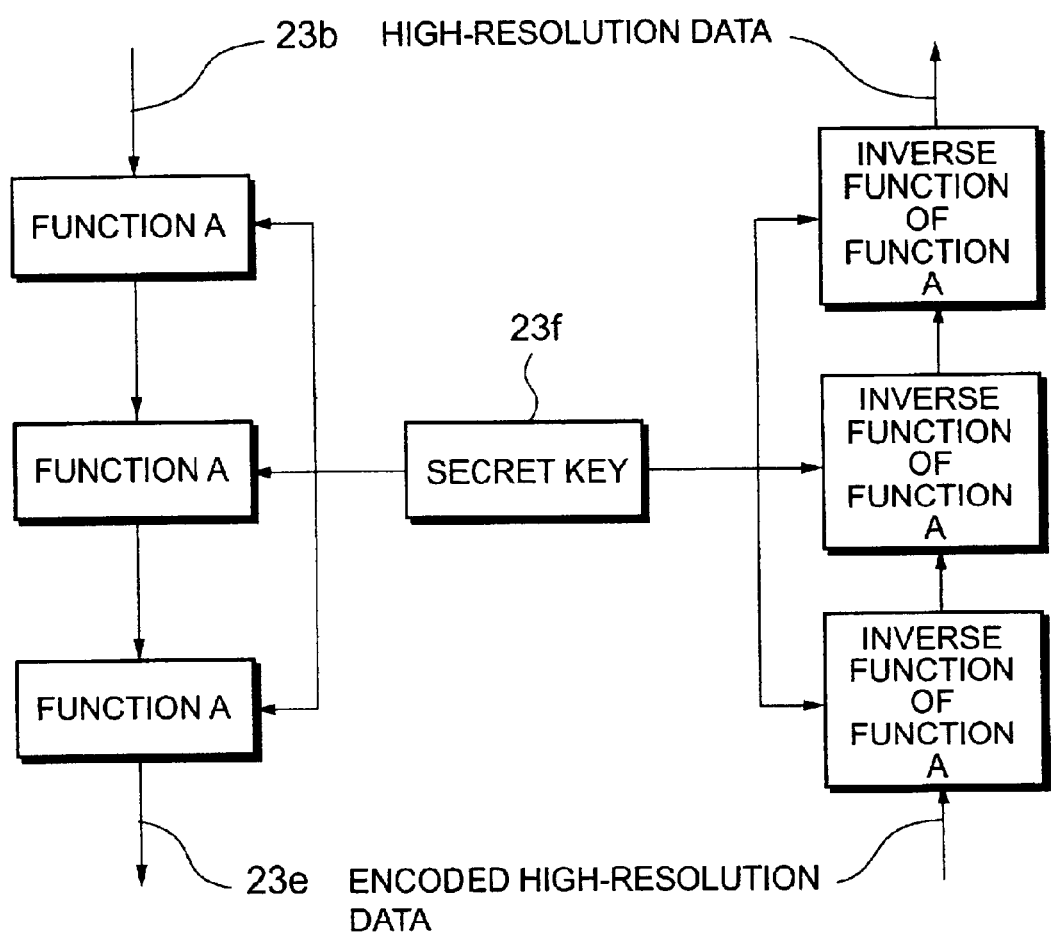
FIG. 11 is a view showing an encoding method of high-resolution data 23e of FIG. 10.

FIG. 11 is a view showing the encoding and decoding method of the high-resolution data 23e.

As the method of encoding the high-resolution data 23e of this embodiment, M6 used by contents protection of IEEE1394 is used, for example. Specifically, as shown in FIG. 11, a processing, in which an operation by a function A constituted of an addition-subtraction, an XOR, a shift operation and the like is performed to the high-resolution data 23b by using the secret key 23f and the operation by the function A using the secrete key 23f is further performed to an operation result, is continuously performed for plural times, and thus the high-resolution data 23b is transformed into the encoded high-resolution data 23e. In addition, the decoding section 31c performs an operation inversely to the coding operation. Specifically, a processing, in which an operation corresponding to an inverse function of the function A is performed to the encoded high-resolution data 23e by using the secret key 23f and the operation corresponding to the inverse function of the function A is further performed to an operation result by using the secret key 23f, is continuously performed for plural times, and thus the encoded high-resolution data 23e is decoded.

Figure 12:
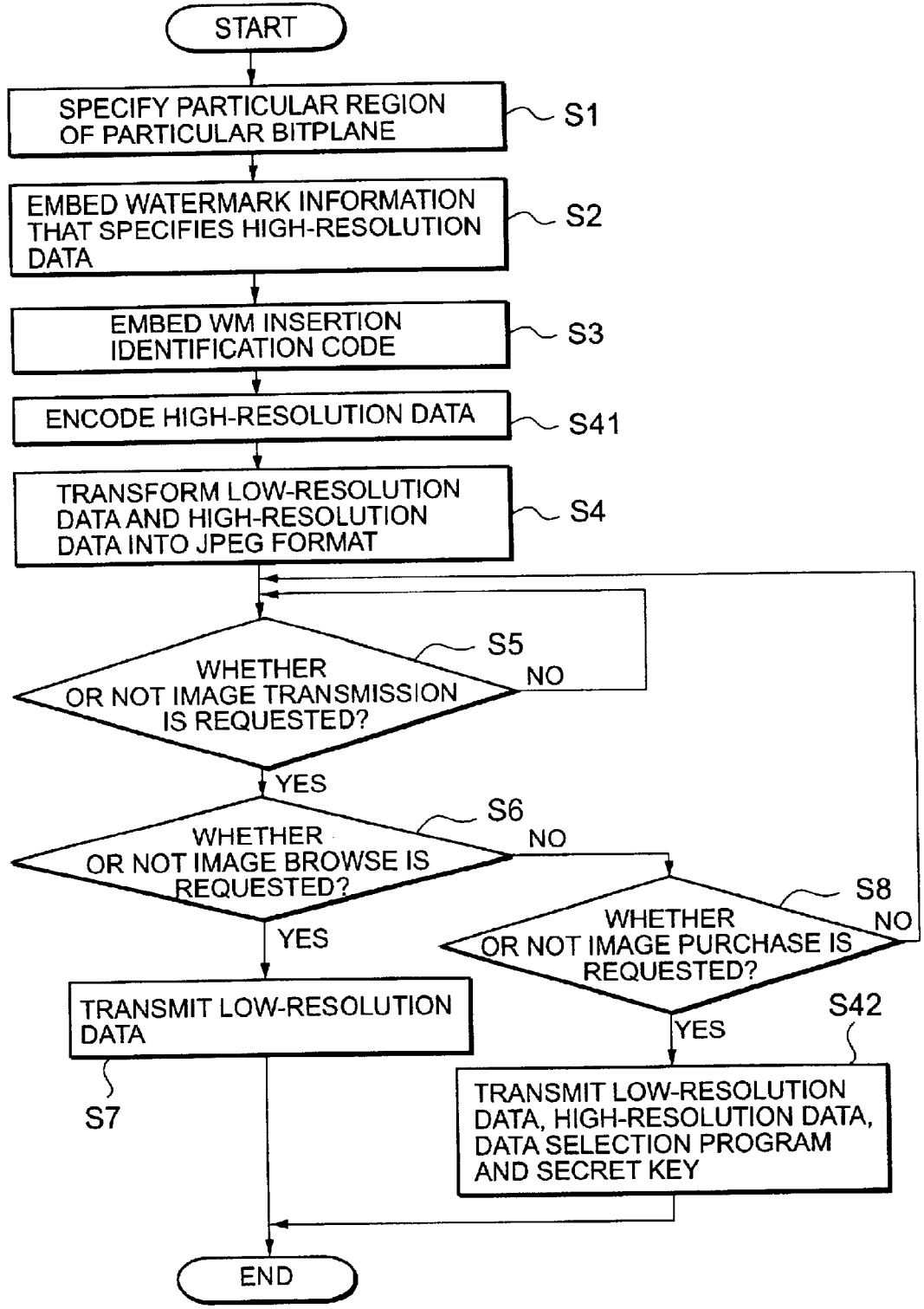
FIG. 12 is a flowchart showing an operation in which the image transmission of FIG. 10 is performed.

Next, description will be made for the operation in which the image transmission of FIG. 10 is performed with reference to FIG. 12. FIG. 12 is a flowchart showing the operation in which the image transmission of FIG. 10 is performed.

Firstly, similarly to the first embodiment, the watermark insertion section 21 specifies the particular region of the particular bitplane P3 of the low-resolution data 23a in advance (step S1), and the WM insertion identification code C and the information D regarding the high-resolution data 23b corresponding to the low-resolution data 23a are embedded into the region as the watermark information, as shown in FIG. 3 (step S3 and S4). In this embodiment, the high-resolution data 23e is encoded by using the secret key 23f stored in the storage unit 34 (step S41). Then, similarly to the first embodiment, the low-resolution data 23a and the high-resolution data 23e are transformed into the JPEG format (step S4).

In response to image browse access from the browser 32 of the client 3, the distribution section 22 of the web server 2 transmits the low-resolution data 23a (steps S5, S6 and S7) similarly to the first embodiment. The browser 32 of the client 3 receives the low-resolution data 23a to reproduce the transmitted low-resolution data 23a of the JPEG, and the monitor 35 displays the image that has been reproduced.

Based on the user's operation, similarly to the first embodiment, the exclusive application (not shown) provided in the client 3 extracts the data in which the low-resolution data 23a, the high-resolution data 23b, the data selection program 23c and the secret key 23f are compressed. This data extraction divides the data into the low-resolution data 23a of the JPEG format, the encoded high-resolution data 23b of the JPEG format, the data selection program 23c and the secret key 23f and stores the divided data into the storage unit 34. In addition, the data selection program 23c, based on the operation of the user, is setup so as to select a file to be displayed and printed when the display instruction and the printing instruction are made from the application 33.

Figure 13:
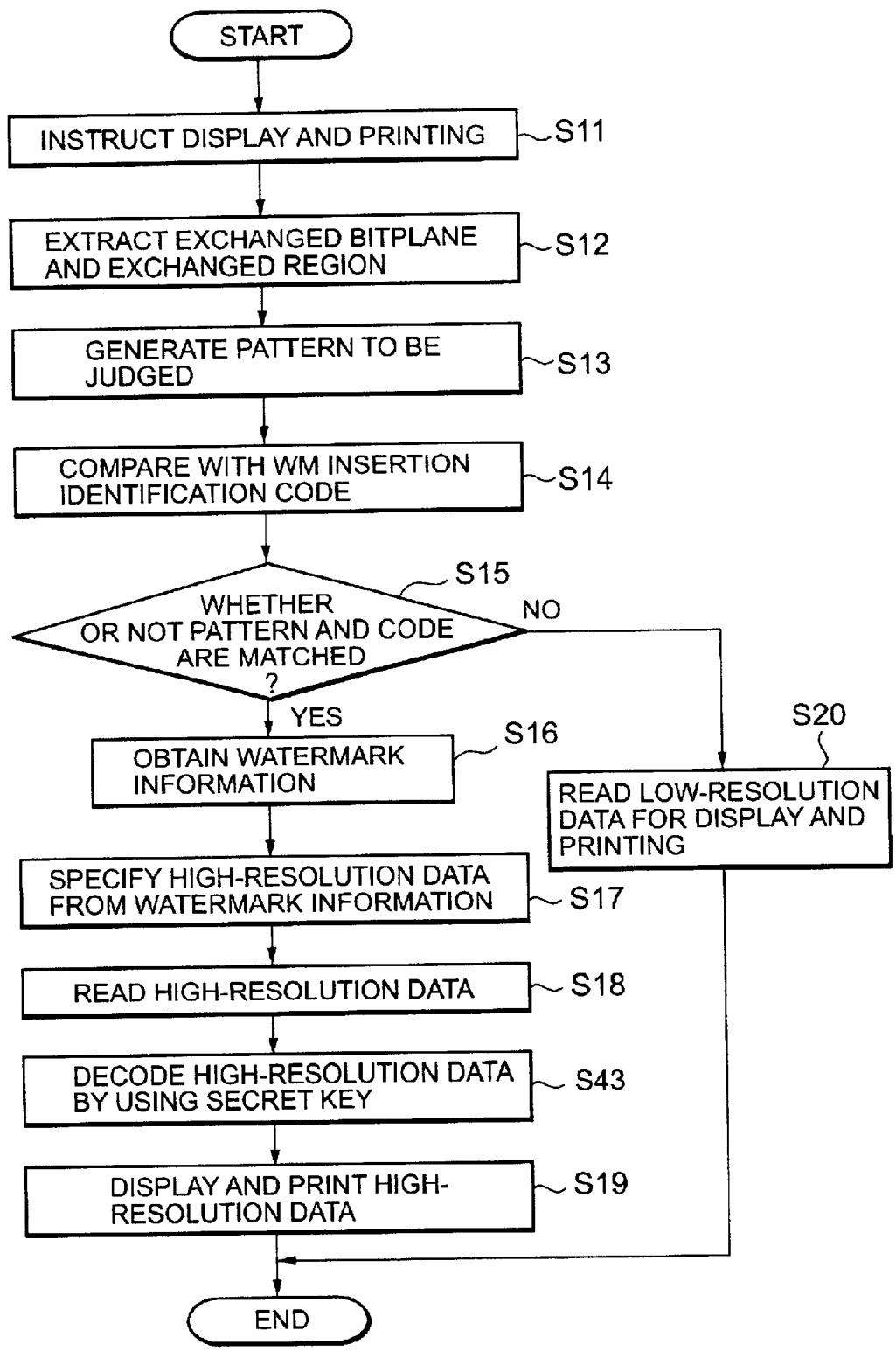
FIG. 13 is a flowchart showing an operation of display or printing of FIG. 10.
Figure 14:
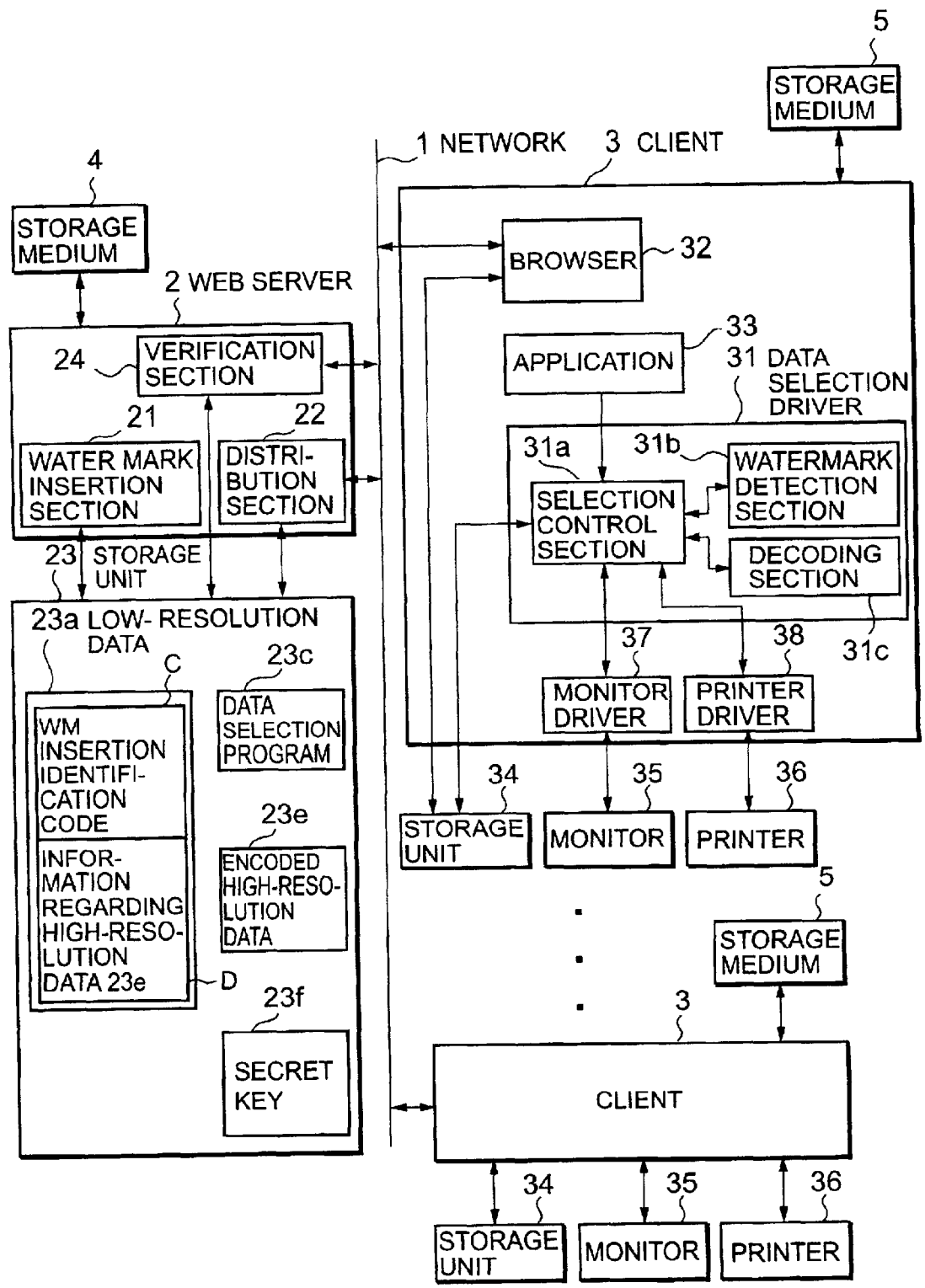
FIG. 14 is a block diagram sowing the constitution of a fourth embodiment of the present invention.
Figure 15:
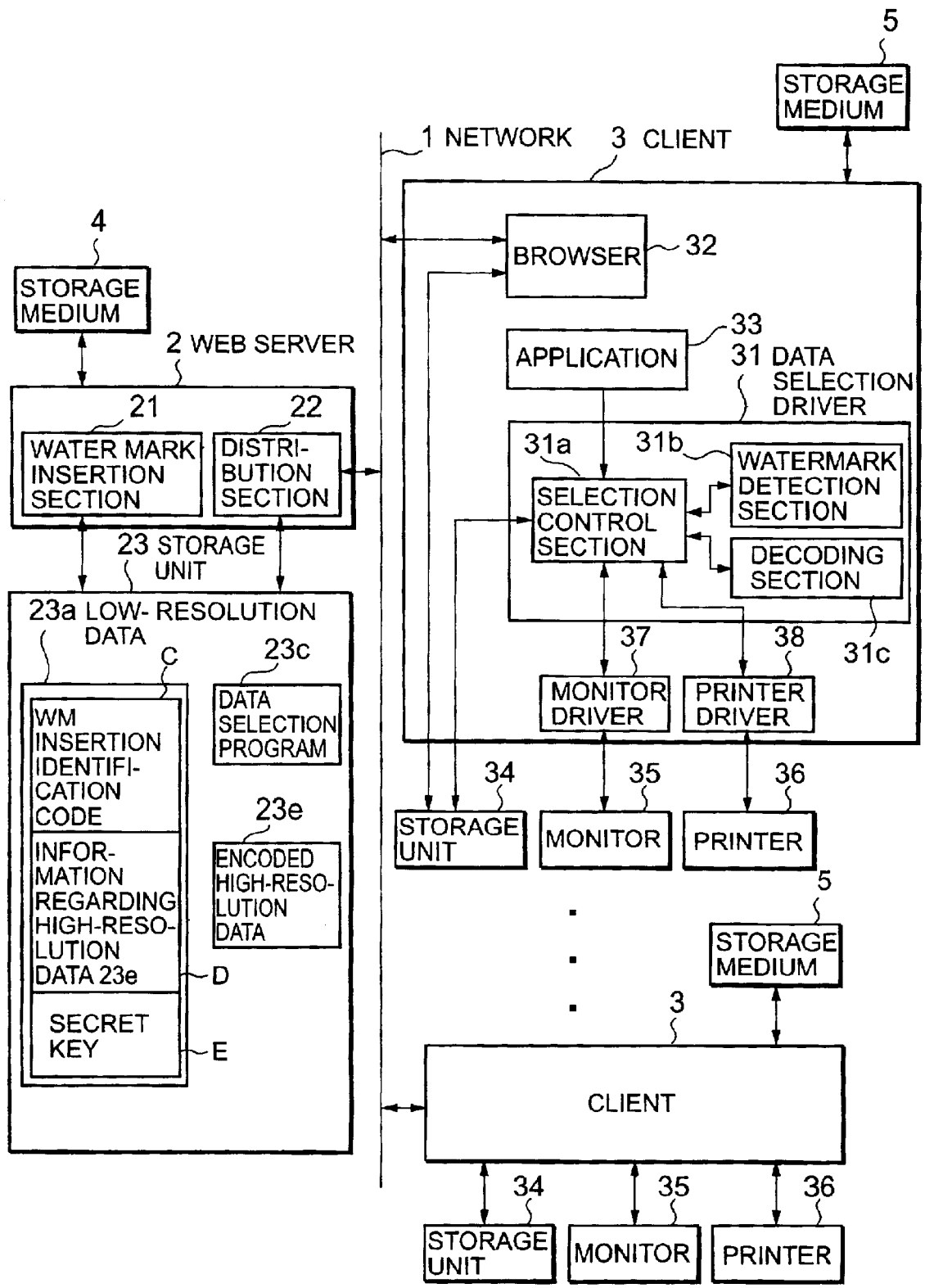
FIG. 15 is a block diagram sowing the constitution of a fifth embodiment of the present invention.

Next, description will be made for operation of display or printing of the low-resolution data 23a and the high-resolution data 23b of FIG. 10 referring to FIG. 13.

Similarly to the first embodiment, when the application 33, based on the user's operation, specifies the low-resolution data 23a to be displayed or printed to issue the display instruction or the printing instruction to the selection driver 31 (step S11), the selection control section 31a of the selection driver 31 reads out the selected low-resolution data 23a from the storage unit 34, and sends the data to the electronic watermark detection section 31b. The electronic watermark detection section 31b reproduces the low-resolution data 23a of the JPEG format, and extracts the region for exchange of the bitplane for exchange (step S12). Then, the pattern to be judged is formed from the information of the extracted region (step S13) and compared with the WM insertion identification code C (step S14), and the detection result of the electronic watermark is output. And then, the selection control section 31a, similarly to first embodiment, obtains the watermark information D such as the storage position of the high-resolution data 23b and the file name when the electronic watermark is detected, specifies the high-resolution data 23e, and reads out the high-resolution data 23e from the storage unit 34 (steps S15, S16, S17 and S18).

Next, in this embodiment, the decoding section 31c decodes the encoded the high-resolution data 23e that has been read out by using the secret key 23f (step S43).

The data is passed to the monitor driver 37 and displayed on the monitor 35 if it is the display instruction. If the data is the printing instruction, it is passed to the printer driver 38 to be printed in the printer 36 (step S19).

Further, if the electronic watermark detection section 31b does not detect the electronic watermark, the selection control section 31a, similarly to the first embodiment, passes the low-resolution data 23a to the monitor driver 37 if it is the display instruction to display it on the monitor 35. If it is the printing instruction, the low-resolution data 23a is passed to the printer driver 38 to be printed in the printer 36 (step S20).

Next, description will be made for the fourth embodiment.

The fourth embodiment is different from the third embodiment in that the web server 2 comprises a verification section 24 that verifies an instrument (i.e., a decoder). In this embodiment, the distribution section 22 does not distribute the secret key 23f to the client even if the purchase request is made by the client 3. Instead, when the electronic watermark detection section 31b detects the electronic watermark, the selection control section 31a is subject to an instrument verification (i.e., to determine whether it is a right (proper) decoder) by the verification section 24, and receives the secret key 23f of the encoded high-resolution data 23e from the storage unit 23 when it is verified to be a right (e.g., proper) decoder of the encoded data. And thus, similarly to the third embodiment, the decoding section 31c decodes the encoded high-resolution data 23e by using the secret key 23f.

Next, description will be made for the fifth embodiment of the present invention.

The fifth embodiment is different from the third embodiment in that the watermark insertion section 21 inserts a secret key E into the low-resolution data 23a in advance, together with the WM insertion identification code C, and the information D regarding the high-resolution data 23b corresponding to the low-resolution data 23a. In this embodiment, when the electronic watermark detection section 31b detects the electronic watermark, the selection control section 31a obtains the secret key E in which the high-resolution data 23e is encoded as one of the extracted watermark information, and the decoding section 31c decodes the encoded high-resolution data 23e by using the secret key E, similarly to the third embodiment.

According to this embodiment, since the secret key E is included in the information detected by the electronic watermark detection section 31b, it does not need to be stored in the storage unit 23.

In the foregoing, the constitution and the operation of the present invention have been described based on the first to the fifth embodiments. The present invention is not limited to this. For example, the insertion method of the electronic watermark is not limited to the one described above, but may be the one in which the electronic watermark is transformed to a noise level difficult to be sensed by a human and inserted into multi-media contents as information. Specifically, the watermark information may be embedded into a particular position discretely selected such that the position is not be conspicuous from peripheral pixels. Alternatively, attention is paid to quantization noise of multi-media to which the electronic watermark is inserted, and its statistical characteristic is examined to constitute a new noise model factitiously, and the watermark information may be embedded utilizing the artificial noise model.

Furthermore, although the low-resolution data and the high-resolution data have been described as monochromatic gradation image data constituted of eight bits per one pixel, they may be color images. In the case of the color image, the watermark information can be embedded into a bitplane of one component among a plurality of components constituting a pixel, such as one of an R component, a G component and a B component, or one of brightness components or color difference components.

Still further, although the low-resolution data and the high-resolution data have been described as the static images compressed in the JPEG format, they may be other type of format and may include moving images and document data.

As described above, according to the printing system of the present invention, display and management of an image can be performed by using a general purpose image display application and a general purpose image management application, and illegal copying by a user who bought the image.

What is claimed is:

1. An image transmission system, comprising:
    a client comprising:
        an image request section that requests transmission of image data;
        an output instruction section that instructs output of an image data file of a general purpose format; and
        an output section that outputs the image data file of the general purpose format designated as an output file;
    a server comprising:
        high-resolution data as the image data file to be transmitted;
        a watermark insertion section that forms low-resolution data as the general purpose format file of the image data, and which provides an electronic watermark to the low-resolution data, the electronic watermark specifying the high-resolution data as watermark information whose resolution is reduced relative to said high-resolution data; and
        a distribution section that transmits the high-resolution data, the low-resolution data, and a data selection program that allows the client to execute a watermark detection processing, wherein said data selection program allows the client to detect existence of the electronic watermark of the low-resolution data whose output is instructed, to specify the high-resolution data from the watermark information and to designate the high-resolution data as the output file when the watermark information is detected, and the low-resolution data is designated as the output data when the watermark information is not detected; and
    a network that connects the client and the server.

2. The image transmission system according to claim 1, wherein said server further secretly holds a secret key that encodes said high-resolution data,
    said client further comprises a decoding section that decodes the encoded high-resolution data,
    said distribution section distributes said low-resolution data, the encoded high-resolution data which is made by encoding said high-resolution data, said data selection program and said secret key to the client via the network, when the client requests transmission of the image data file, and
    said data selection program allows said decoding section to decode said encoded high-resolution data by using said secret key, when the electronic watermark is detected in the client.

3. The image transmission system according to claim 2, wherein said server further includes a verification section that distributes said secret key when the client who requests purchasing of data is verified to include a proper decoder for the encoded high-resolution data,
    said distribution section distributes said low-resolution data, the encoded high-resolution data and said data selection program to the client via the network, when the client requests transmission of the image data file, and
    said data selection program allows said client to be subject to an instrument verification by said verification section, when the electronic watermark is detected in the client, and allows the decoding section to decode said encoded high-resolution data by using said secret key, when the client is verified to be the proper decoder of the encoded high-resolution data to receive the data.

4. The image transmission system according to claim 2, wherein said watermark insertion section further inserts the electronic watermark having the secret key as watermark information, and
    said data selection program allows the client to obtain said secret key as one of extracted watermark information and allows the decoding section to decode the encoded high-resolution data by using said secret key, when the electronic watermark is detected in the client.

5. An image transmission method, comprising:
    forming low-resolution data as a general purpose format file of image data by a server, and to which an electronic watermark is provided, the electronic watermark specifying high-resolution data as watermark information, whose resolution is reduced relative to said high-resolution data being an image data file to be transmitted;
    requesting transmission of the image data file by a client connected with the server via a network; and
    transmitting a program in which the server allows the client to detect the high-resolution data, the low-resolution data, and existence of the electronic watermark of the low-resolution data whose output is instructed, and the program that allows the client to execute a watermark detection process of specifying the high-resolution data from said watermark information to designate the high-resolution data as an output file when the electronic watermark is detected and designating the low-resolution data as the output file when the electronic watermark is not detected.

6. A recording medium, wherein a program is recorded such that a server is enabled to read the program that allows said server connected with a client who requests transmission of an image data file via a network to execute a process of forming low-resolution data as a general purpose format file of image data to which an electronic watermark is provided, the electronic watermark specifying high-resolution data as watermark information whose resolution is reduced relative to the high-resolution data being an image data file to be transmitted, and to execute a process of transmitting a program in which the server allows the client to detect the high-resolution data, the low-resolution data, and existence of the electronic watermark of the low-resolution data whose output is instructed, and the program that allows the client to execute a watermark detection process of specifying the high-resolution data from said watermark information to designate the high-resolution data as an output file when the electronic watermark is detected and designating the low-resolution data as the output file when the electronic watermark is not detected.

* * * * *